US008928665B2

(12) United States Patent
Fonseca Da Trindade et al.

(10) Patent No.: US 8,928,665 B2
(45) Date of Patent: Jan. 6, 2015

(54) SUPPORTING RECURSIVE DYNAMIC PROVENANCE ANNOTATIONS OVER DATA GRAPHS

(75) Inventors: Joana M. Fonseca Da Trindade, Champaign, IL (US); Anastasios Kementsietsidis, New York, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 13/164,914

(22) Filed: Jun. 21, 2011

(65) Prior Publication Data

US 2012/0327087 A1   Dec. 27, 2012

(51) Int. Cl.
*G06T 11/20* (2006.01)

(52) U.S. Cl.
CPC .................................... *G06T 11/206* (2013.01)
USPC .......................................... 345/440; 707/798

(58) Field of Classification Search
CPC ....................... G06F 17/30958; G06T 11/206
USPC .......................................... 345/440; 707/798
See application file for complete search history.

(56) References Cited

U.S. PATENT DOCUMENTS

| 8,145,624 | B1 * | 3/2012 | Srivastava et al. | 707/714 |
| 2008/0120281 | A1 * | 5/2008 | Marceau et al. | 707/3 |
| 2010/0114627 | A1 | 5/2010 | Adler et al. | |
| 2010/0114628 | A1 | 5/2010 | Adler et al. | |
| 2010/0114629 | A1 | 5/2010 | Adler et al. | |
| 2010/0287204 | A1 | 11/2010 | Amini et al. | |
| 2010/0306278 | A1 * | 12/2010 | Oliver et al. | 707/803 |
| 2012/0166378 | A1 * | 6/2012 | Valerio et al. | 706/47 |
| 2012/0185871 | A1 * | 7/2012 | Allen et al. | 719/313 |

OTHER PUBLICATIONS

Anand et al., "Provenance Browser: Displaying and Querying Scientific Workflow Provenance Graphs", 2010 IEEE 26th International Conference on Data Engineering (ICDE 2010), pp. 1201-1204, Mar. 2010.

Bowers et al., "Provenance in collection-oriented scientific workflows", Concurrency and Computation: Practice and Experience, Concurrency Computat.: Pract. Exper. 2008; 20: pp. 519-529, Published online Aug. 8, 2007.

Carroll et al., "Named graphs, provenance and trust" In WWW: Proceedings of the 14th international conference on World Wide Web, pp. 613-622, May 2005.

Davidson et al., "Provenance and scientific workflows: challenges and opportunities" in SIGMOD, pp. 1345-1350, Jun. 2008.

(Continued)

*Primary Examiner* — Maurice L McDowell, Jr.
(74) *Attorney, Agent, or Firm* — Tutunjian & Bitetto, P.C.; Preston Young

(57) ABSTRACT

Systems and methods are provided for supporting dynamic provenance annotations over data graphs. A method includes receiving a plurality of dynamic graphs representing dynamic provenance data. The method further includes evaluating a provenance query over the plurality of dynamic graphs to obtain an answer to the provenance query. The method additionally includes providing the answer to the provenance query to a user, using at least a display device.

25 Claims, 7 Drawing Sheets

(56) References Cited

OTHER PUBLICATIONS

Freire et al., "Provenance for Computational Tasks: A Survey", Computing in Science & Engineering, vol. 10 Issue:3, pp. 11-21, May-Jun. 2008.

Geerts et al., "Mondrian: Annotating and Querying Databases through Colors and Blocks" In Proceedings of the International Conference on Data Engineering (ICDE), Apr. 2006. (10 pages).

Green et al., "Provenance semirings" Proceedings of the twenty-sixth ACM SIGMOD-SIGACT-SIGART symposium on Principles of database systems, pp. 31-40, Jun. 2007.

Karvounarakis et al., "Querying Data Provenance", SIGMOD '10 Proceedings of the 2010 international conference on Management of data, pp. 951-962, Jun. 2010.

Khan et al., "SNTS: Sensor network troubleshooting suite" In 3rd IEEE Int. Conf. on Distributed Computing in Sensor Systems (DCOSS), pp. 142-157, Jun. 2007.

Khan et al., "Finding symbolic bug patterns in sensor networks" Int. Conf. on Distributed Computing in Sensor Systems (DCOSS), pp. 131-144, Jun. 2009.

Moreau et al., "The provenance of electronic data" Communications of the ACM, vol. 51, Issue 4, pp. 52-58, Apr. 2008.

Srivastava et al., "Intentional associations between data and metadata" In Proceedings of the ACM SIGMOD Conference, pp. 401-412, Jun. 2007.

Tan, "Provenance in Databases: Past, Current, and Future" in IEEE Data Eng. Bull., 30(4): Dec. 2007. (10 pages).

Wang et al., "Provenance-based Information Trustworthiness Evaluation in Multi-hop Networks" Globecom, Dec. 2010. (6 pages).

\* cited by examiner

SUPPORTING RECURSIVE DYNAMIC PROVENANCE ANNOTATIONS OVER DATA GRAPHS

GOVERNMENT RIGHTS

This invention was made with Government support under Contract No.: W911NF-09-2-0053 awarded by the U.S. Army. The Government has certain rights in this invention.

BACKGROUND

1. Technical Field

The present invention generally relates to data graphs and, more particularly, to supporting recursive dynamic provenance annotations over data graphs.

2. Description of the Related Art

Existing works directed to provenance are limited to annotations over primitive nodes, rather than annotations that span subgraphs. Additionally, we note the following further deficiencies of the prior art. For example, prior art graph representation models only support simple, static links. Moreover, graphs in the prior art are defined extensionally or as mere macros, thus providing no support for dynamic data. Additionally, queries in the prior art are limited within a single graph and do not span (or use) the links between graphs. Also, if triples are part of more than one graph, then such triples have to be replicated for each of the graphs. Thus, the prior art associated with provenance suffers from quite a number of deficiencies, which significantly limits the applications to which such prior art provenance may be applied.

SUMMARY

According to an aspect of the present principles, a method is provided. The method includes receiving a plurality of dynamic graphs representing dynamic provenance data. The method further includes evaluating a provenance query over the plurality of dynamic graphs to obtain an answer to the provenance query. The method additionally includes providing the answer to the provenance query to a user, using at least a display device.

According to another aspect of the present principles, a system is provided. The system includes a user interface having an input device configured to receive a plurality of dynamic graphs representing dynamic provenance data. The system further includes a query evaluator configured to evaluate a provenance query over the plurality of dynamic graphs to obtain an answer to the provenance query. The user interface further includes a display device configured to provide the answer to the provenance query to a user.

According to yet another aspect of the present principles, a computer readable storage medium is provided which includes a computer readable program that, when executed on a computer causes the computer to perform the respective steps of the aforementioned method.

According to still another aspect of the present principles, a method is provided. The method includes receiving a set $V_G$ of data graphs representing dynamic provenance data, receiving a set $E_G$ of data links between the data graphs in the set $V_G$, receiving a set $V_Q$ of query graph patterns; and receiving a set $E_Q$ of query links between the query graph patterns in $V_Q$. The method further includes evaluating an input query represented by the query graph patterns linked with the query links, over the data graphs linked with the data links, to obtain an answer. The method additionally includes providing the answer to a user, using at least a display device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As noted above, the present principles are directed to supporting recursive dynamic provenance annotations over data graphs.

As also noted above, existing works directed to provenance are limited to annotations over primitive nodes, rather than annotations that span subgraphs. Accordingly, the present principles will address these limitations and provide new techniques to promote graphs as first-class citizens. The phrase "first-class citizens", used herein with respect to the graph linking model, refers to allowing links between whole graphs. That is, while traditional works have focused on the representation and linking of nodes (corresponding to entities), our work goes beyond that by allowing links between whole graphs. Thus, sets of triples forming a graph are referable and links can be established not only between single-entity subjects or objects, but also between whole graphs.

We posit that provenance modeling and analysis consider graph structures as first-class citizens. The model will allow the representation and querying of relationships between graphs for the purposes of trust, while diagnostic analysis will support reasoning and trust assessment over such graphs. The end result will be a framework capable of identifying poor sources of information, malfunctioning sensors, bad intelligence reports, mis-configured data processing modules, or software problems (bugs) in automated analysis of data. Of course, given the teachings of the present principles provided herein, one of ordinary skill in this and related arts will contemplate the preceding and other items capable of being readily identified using the present principles.

Figure 1:
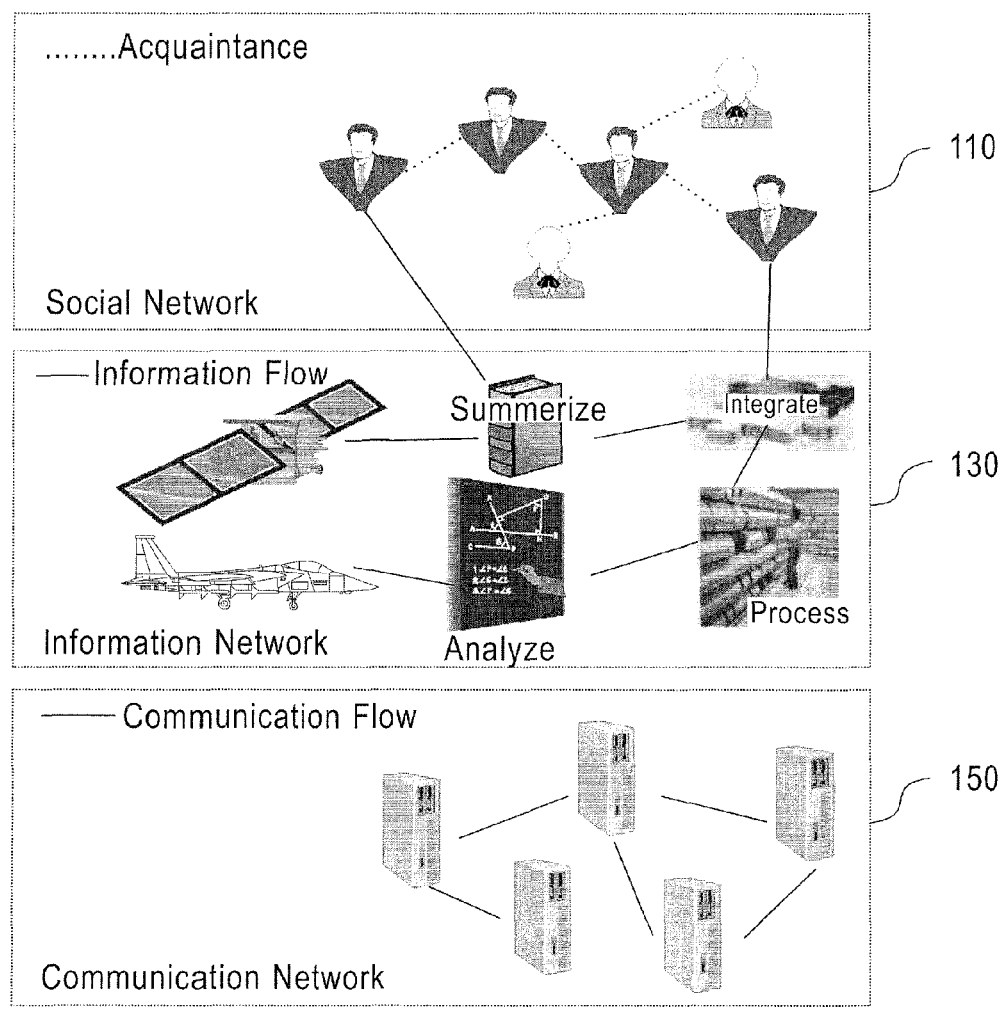
FIG. 1 shows various networks 100 to which the present principles may be applied, according to an embodiment of the present principles.

Establishing provenance graph annotations is key to assessing trust. FIG. 1 shows various networks 100 to which the present principles may be applied, according to an embodiment of the present principles. The various networks 100 include a social network 110, an information network 130, and a communication network 150. Of course, the preceding types of networks are merely illustrative and, thus, the present principles may also be applied to other types of networks while maintaining the spirit thereof.

Consider with respect to FIG. 1 an information network sub-graph $G_1^{Inf}$ of including nodes Summarize and Integrate. Our trust in the information flowing out of $G_1^{Inf}$ is influenced by our trust of the data flowing into $G_1^{Inf}$. If some of the individuals in the social network 110 influence the sub-graph $G_1^{Soc}$ of informants feeding data to $G_1^{Inf}$, in order to assess the trust in $G_1^{Inf}$ we must capture its relationship with $G_1^{Soc}$. Annotating $G_1^{Inf}$ with $G_1^{Soc}$ achieves this goal. In turn, determining the trust of $G_1^{Soc}$ requires another graph, say $G_2^{Inf}$, corresponding to information sources including data for the individuals in $G_1^{Soc}$. Therefore, one goal of the present principles is to provide support for recursive graph annotations, noting that the same is not currently supported by any known existing work.

Another goal is supporting dynamic graph annotations over annotations over evolving composite networks. Assuming the informants of $G_1^{Inf}$ now include every soldier in a battlefield, $G_1^{Inf}$ must be annotated by a dynamic social network sub-graph, since as new soldiers join the battlefield they become part of the $G_1^{Inf}$ annotation. Currently, dynamic annotations are mere macros that are evaluated before any operation. In accordance with the present principles, we will reason over the definition of dynamic annotations, without requiring their evaluation, thus improving query performance. This reasoning over the definitions necessitates the syntactic analysis of the dynamic annotation definitions, the identification of static (constant) and dynamic (variable) parts of the definitions, as well as the semantic and schematic structure of the definitions. It further necessitates the study of query containment and query composition in the context of graph query algebras, topics that are currently unexplored.

Yet another goal is studying annotation operations. Studying the operation semantics will answer questions like: If graph G is annotated with G', is every sub-graph of G also annotated with G' (a.k.a. annotation inheritance)? If graphs $G_1$ and $G_2$ are annotated with $G_1'$ and $G_2'$, respectively, what is the annotation of their intersection $G_1 G_2$? The limited work in treating graphs as first-class citizens has only considered simple graph relationships without considering the effects of annotation operations. The present principles involve both the annotation semantics and those of their operations. Annotation inheritance has received limited attention, and only for non-graph data. The present principles will generalize inheritance for the richer graph setting.

We note that RDF unfortunately does not allow for representing dynamic graphs, nor relationships among graphs. To support dynamic graphs for the purposes of the present principles, we propose with respect to one embodiment extending the RDF data model with the notion of variables. The variables may be used, for example, as values for the subjects/predicates/objects of a triple. For example, a RDF+V statement is an extended reified RDF statement where the subject and/or object can also be a variable. To that end, we provide the following exemplary statement:

t=(uri, subject, predicate, object)

where "uri" denotes an universal resource identifier (URI), "subject" denotes an URI, a blank node, or a variable, "predicate" denotes an URI or a variable, "object" denotes an URI, a blank node, a literal, or a variable, and "name(t)"=uri. Hence, a RDF+V syntax allows intensional representations of graphs, as opposed to extensional in traditional RDF.

A RDF+V graph (or "graph pattern") comprises a set of RDF+V tuples. We then extend the existing work on named graphs with the inclusion of a graph pattern into the graph definition. To that end, we provide the following exemplary statement:

nqg=(n, gp)

wherein "n" denotes an URI, and "gp" denotes a RDF+V Graph.

We also extend the RDF data model to express relationships (predicates) between dynamic graphs. For example, an RDF+Q statement is an extended RDF+V statement where the subject and/or object can also be a named query graph. To that end, we provide the following exemplary statement:

t=(subject, predicate, object)

where "subject" denotes an URI, a blank node, a variable, or a named query graph, "predicate" denotes an URI or a variable, and "object" denotes an URI, a blank node, a variable, a literal, or a named query graph.

Furthermore, we define the semantics of an inheritance property for predicates between two named query graphs. The syntax of predicates between named query graphs allows for defining inheritance for subject and/or object. We note that the predicate between two named query graphs can also be non-inheriting, which results in a corresponding graph being treated as an "unit".

Also, we extend the semantics and syntax of SPARQL to support queries over RDF+Q datasets. For example, in an embodiment, we use only a subset of SPARQL, namely only conjunctive queries in a WHERE clause (e.g., no filter). To that end, we note that statements in a WHERE clause are similar to RDF+Q statements. For example, subjects and objects can be named query graphs, and subjects and objects can also be graph patterns.

We then in an embodiment define the semantics of a join between named query graphs as the rewriting of the query in terms of the other. Thus, in an embodiment, the rewritten query returns the resulting dataset from first applying one query, and then the other query. Hence, in an embodiment, the final result is the union of all rewriting obtained. Another option is to perform a query containment check amongst all rewritings and return the most general query. Advantageously, query materialization is not required.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the foini of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As used herein, "dynamic data" or "dynamic provenance data" refers to data that is capable of changing, i.e., that is non-static. Such changing may occur, for example, in direct response to a user input or due to changes in the underlying data or data source. Hence, even when some particular dynamic provenance data has been input to a system implementing the present principles, such dynamic provenance data is capable of being changed and/or otherwise modified. For example, we note that the user input 310 described with respect to FIG. 3 hereinafter affords a user the capability to visually edit a query, and may further be used to edit the input data over which the query is evaluated. Moreover, we note that in an embodiment, the dynamic provenance data may include dynamic annotations representing provenance data and/or provenance metadata, where the dynamic annotations are also capable of changing, either in direct response to a user input or due to changes in the underlying data or data source. We note that the present principles may be applied to dynamic data or combinations of dynamic and static data.

Figure 2:
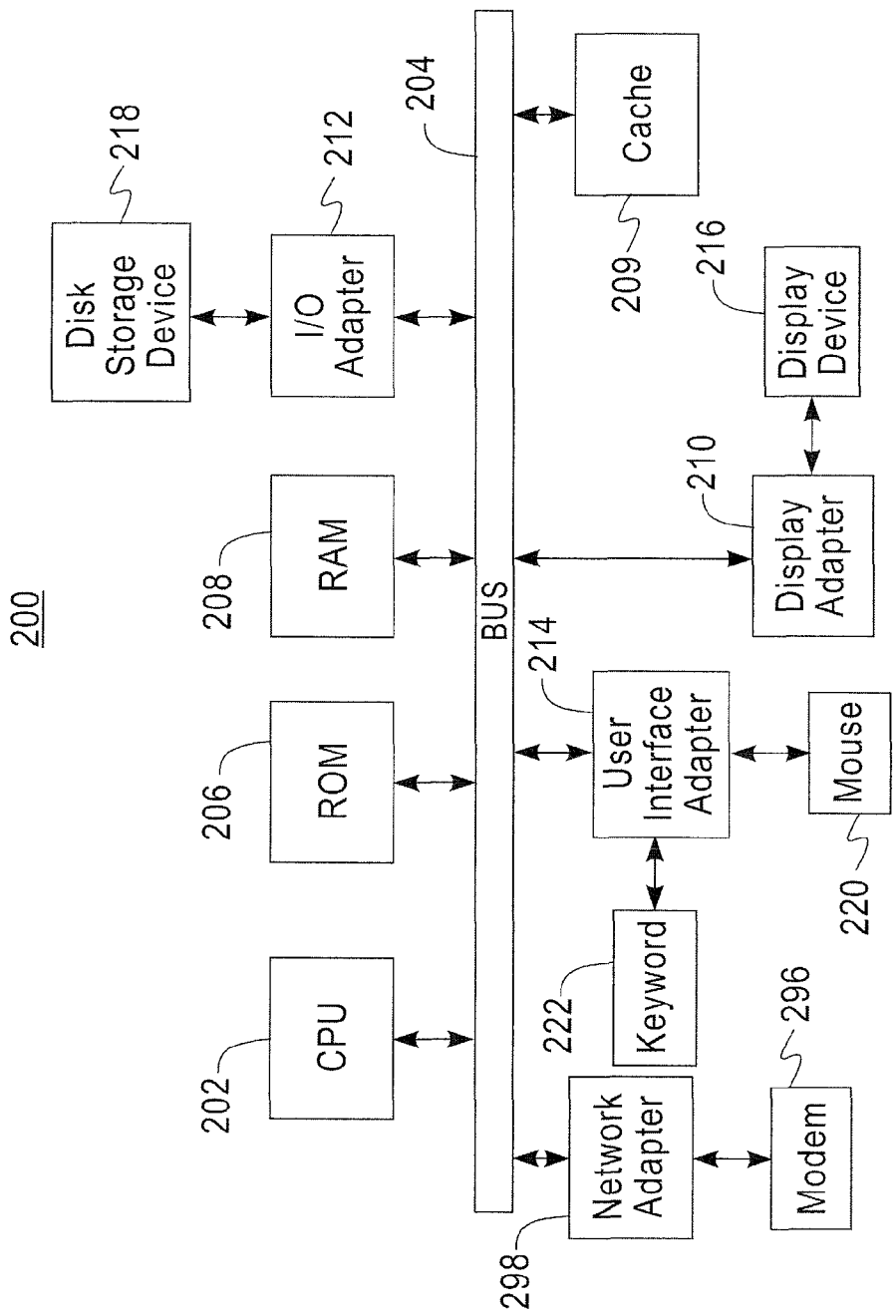
FIG. 2 is a block diagram showing an exemplary processing system 200 to which the present invention may be applied, according to an embodiment of the present principles.

FIG. 2 is a block diagram showing an exemplary processing system 200 to which the present invention may be applied, according to an embodiment of the present principles. The processing system 200 includes at least one processor (CPU) 202 operatively coupled to other components via a system bus 204. A read only memory (ROM) 206, a random access memory (RAM) 208, a display adapter 210, an I/O adapter 212, a user interface adapter 214, and a network adapter 298, are operatively coupled to the system bus 204.

A display device 216 is operatively coupled to system bus 204 by display adapter 210. A disk storage device (e.g., a magnetic or optical disk storage device) 218 is operatively coupled to system bus 204 by I/O adapter 212.

A mouse 220 and keyboard 222 are operatively coupled to system bus 204 by user interface adapter 214. The mouse 220 and keyboard 222 are used to input and output information to and from system 200.

A (digital and/or analog) modem 296 is operatively coupled to system bus 204 by network adapter 298.

Of course, the processing system 200 may also include other elements (not shown), including, but not limited to, a sound adapter and corresponding speaker(s), and so forth, as readily contemplated by one of skill in the art.

Figure 3:
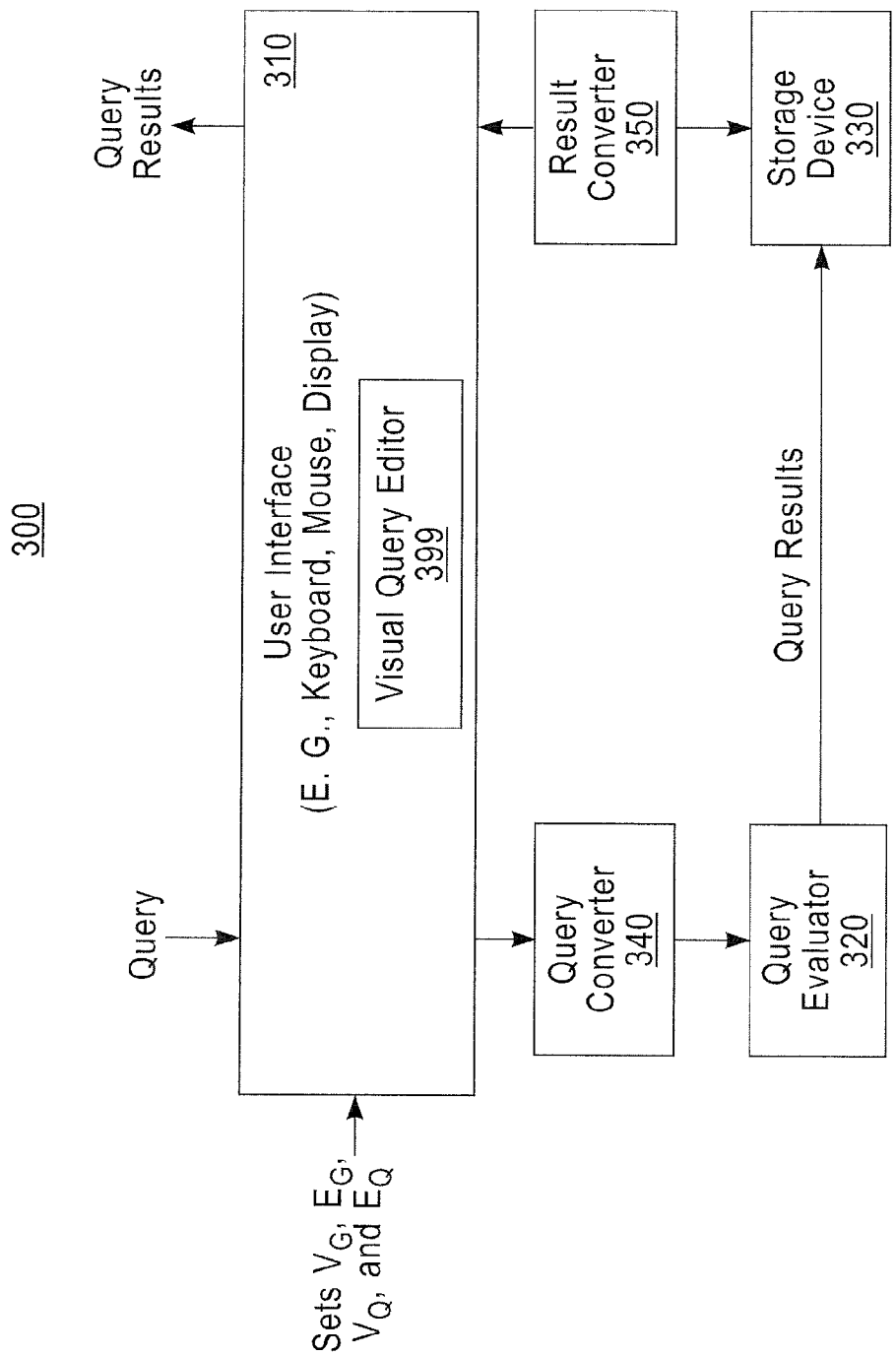
FIG. 3 shows an exemplary system 300 for supporting recursive dynamic provenance annotations over data graphs, according to an embodiment of the present principles.

FIG. 3 shows an exemplary system 300 for supporting recursive dynamic provenance annotations over data graphs, according to an embodiment of the present principles. The system 300 includes a user interface 310, a query evaluator 320, and a storage device 330. The system 300 may also include a query converter 340 and a result converter 350.

The user interface 310 is for receiving input data (query and underlying data over which query is performed) and for providing output data (query results) responsive to the input data. The input data may include, for example, a set $V_G$ of data graphs, a set $E_G$ of data links between the data graphs in the set $V_G$, a set $V_Q$ of query graph patterns, and a set $E_Q$ of query links between the query graph patterns in the set $V_Q$. The output data includes an answer to an input query, the latter as represented by the aforementioned input data. It is to be appreciated that in some embodiments, the query itself may provide the sets $V_G$, $E_G$, $V_Q$, and $E_Q$. That is, a query may be provided by a user which is directed to the sets, with such sets being provided independently of the query. In other embodiments, the query itself may be expressed in terms of one or more of the aforementioned sets.

The query evaluator 320 evaluates an input query with respect to the items input to the input device 310, as described in further detail herein below. The storage device 330 stores the results (e.g., answer) of the query evaluation, which can be retrieved there from and provided to the user via the user interface 310 (for example, on a display of the user interface 310).

Thus, the user interface 310 receives user queries from a user, and provides results for such queries to the user. Hence, in an embodiment, the user interface 310 may include, but is not limited to, for example, a keyboard, a mouse, and a display device. Of course, other configurations of a user interface may also be used in accordance with the present principles, while maintaining the spirit of the present principles, such as omitting the keyboard or mouse, adding another element (a speaker or another display), and/or substituting one element for another (for example substituting at least one of the keyboard and mouse for a microphone for receiving speech inputs). From the perspective of layers, the user interface 310 may be considered to include a query editor layer (for inputs), and a result presentation layer (for outputs).

The user interface 310 can be used by a user to visually build and/or edit the queries. Thus, in an embodiment, the user interface 310 includes a visual query editor 399. Since the return nodes in a graph might be graphs themselves, the user interface 310 can include an expand/collapse feature, where graphs can be collapsed or expanded to show inner triples. Additionally, dynamic query graph triples can have an expand capability, where results at the data level would be displayed (e.g., all the data satisfying the dynamic graph or a sample).

In an embodiment, the query evaluator 320 comprises at least a processor for performing an evaluation as described herein of dynamic data graphs that include dynamic provenance data (and possibly also include static provenance data). Moreover, the query evaluator 320 may include a memory store for use in performing the evaluation or may use the storage device 330.

In an embodiment, the query evaluator 320 includes a SPARQL query engine that supports SPARQL+Q queries over recursively connected dynamic graphs (as well as "normal" SPARQL queries which are a subset of the queries above).

In an embodiment, the query evaluator 320 can take as input either properly formed SPARQL+Q queries, or translate the XML format output from the visual query editor (i.e., the user interface 310) to SPARQL+Q. Alternatively, the query converter 340 may perform such translation.

In the case where the storage device 330 natively supports SPARQL+Q, the query evaluator 320 will evaluate the query as such over the storage device 330. If the storage device 330 is a vanilla RDF store, then the query evaluator 320 will convert the input SPARQL+Q query to SPARQL. If the storage layer is an SQL (relational)) database (DB), then the query evaluator 320 will convert the input SPARQL+Q query to SQL.

In an embodiment, the query converter 340 is used to accept SPARQL+Q queries and transform such queries into well formed SQL queries, where the term "well formed" refers to the fact that the resulting SQL queries are syntactically correct queries in accordance with the SQL query language standard and can be accepted and evaluated as such (without further modifications) by any vanilla relational database. The result converter 350 converts the outputs of the queries as a list of tuples (custom class representing a SQL tuple).

The storage device 330 can support a native implementation of RDF+QV and accept as input native SPARQL+Q queries. Alternatively, the storage device 330 can be a vanilla RDF store that only supports SPARQL. In that case, the input SPARQL+Q queries are translated by the query evaluator 320 into SPARQL. The storage device 330 can include appropriate representations of the RDF+QV triples that should be expressed in RDF. This translation of RDF+QV->RDF might include special triples for defining named graphs, special subject/object values to represent variables, and special properties of predicates to represent the non(inheritance) of property values between named graphs.

A description will now be given of a relational representation implemented by the storage device 330, in accordance with an exemplary embodiment. The storage device 330 may be a SQL database designed using PostgreSQL or any other relational database management system. We now describe two optional schemas that can be used.

Regarding the first schema, a single relation is used to hold all triples, including triples with variables and triples describing dynamic query graphs. TABLE 1 shows an example of the first schema for the storage device 330, according to an embodiment of the present principles.

TABLE 1

| | | Triples | |
|---|---|---|---|
| id | subject | predicate | object |
| 1 | a1 | b1 | c1 |
| 2 | a1 | b2 | _varX |
| 3 | _g1 | includes | 1 |
| 4 | _g1 | includes | 2 |

Regarding the second schema, one relation (hereinafter the "first relation") is used to hold all "first layer" triples, including triples with variables, and another relation (hereinafter the "second relation") is used to hold all triples describing dynamic query graphs. TABLE 2 shows an example of the first relation of the second schema, and TABLE 3 shows an example of the second relation of the second schema, according to an embodiment of the present principles.

TABLE 2

| | | Triples | |
|---|---|---|---|
| id | subj | pred | obj |
| #1 | a1 | b1 | c1 |
| #2 | a1 | b2 | _varX |

TABLE 3

| | Graphs | |
|---|---|---|
| id | graphName | tripleId (FK) |
| #3 | _g1 | Triples.#1 |
| #4 | _g1 | Triples.#2 |

The result converter 350 can perform an operation that is opposite from (i.e., inverse to) an operation performed by the query evaluator 320. That is, the result converter 350 is responsible for retrieving the "raw" data from the storage layer (RDF+QV, RDF, or relational) that satisfy the query sent to the storage layer, and then converting those to an appropriate data instance of the RDF+QC model. The instance is such that it satisfies the input SPARQL+Q query by the user.

Figure 4:
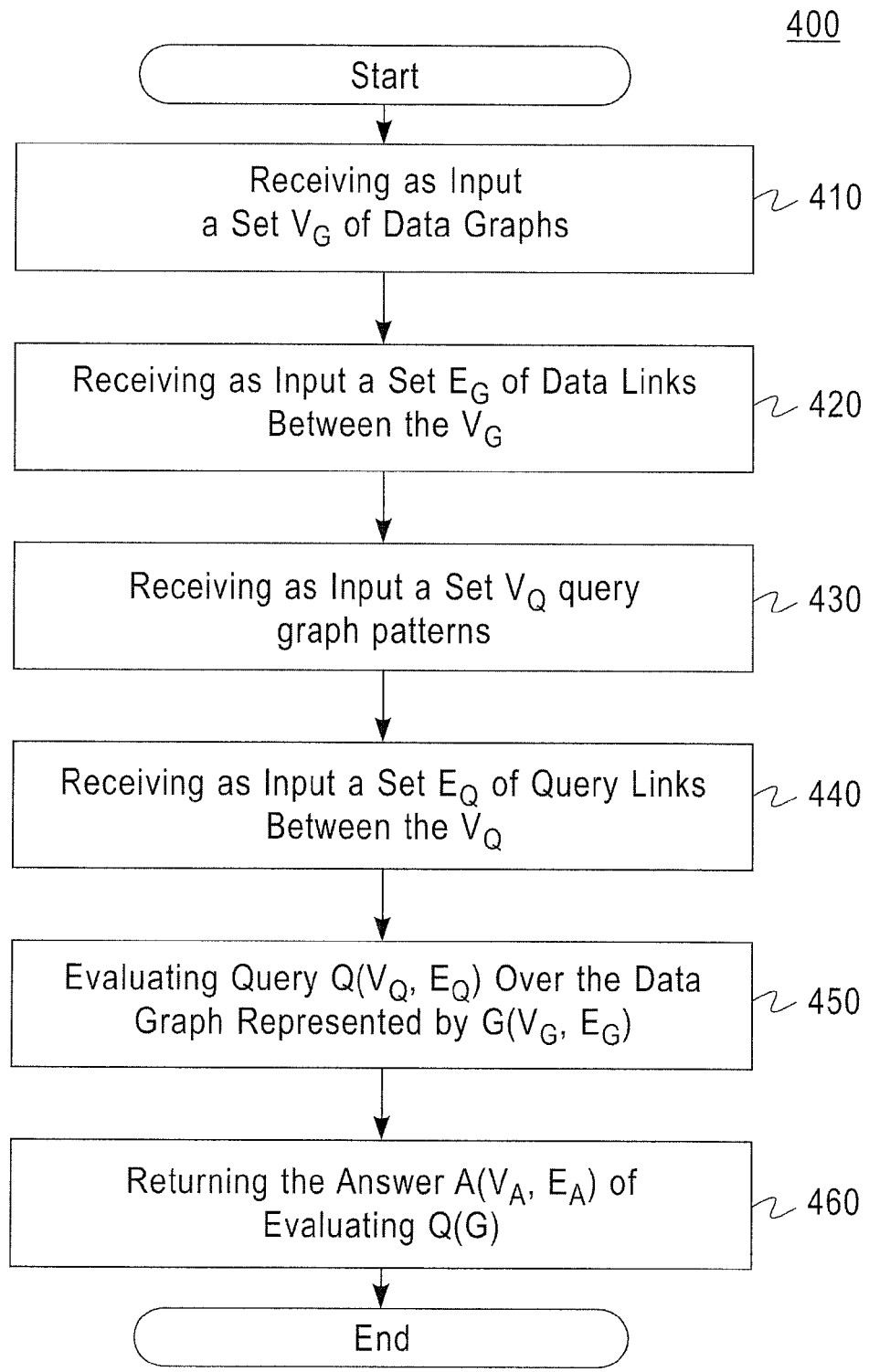
FIG. 4 shows a method 400 for supporting recursive dynamic provenance annotations over data graphs, according to an embodiment of the present principles.
Figure 5:
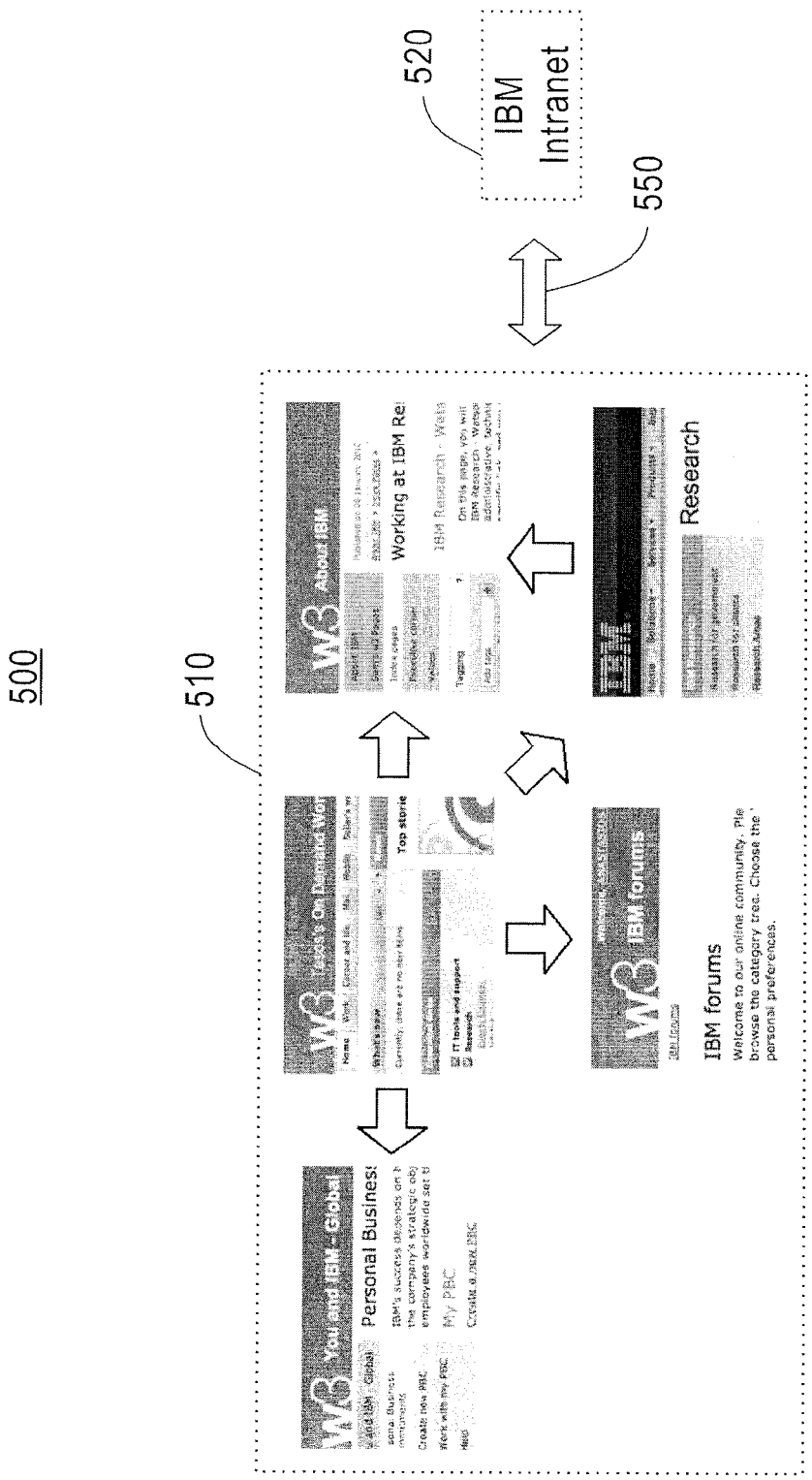
FIG. 5 shows an example of graph linking 500 to which the present principles may be applied, according to an embodiment of the present principles.
Figure 6:
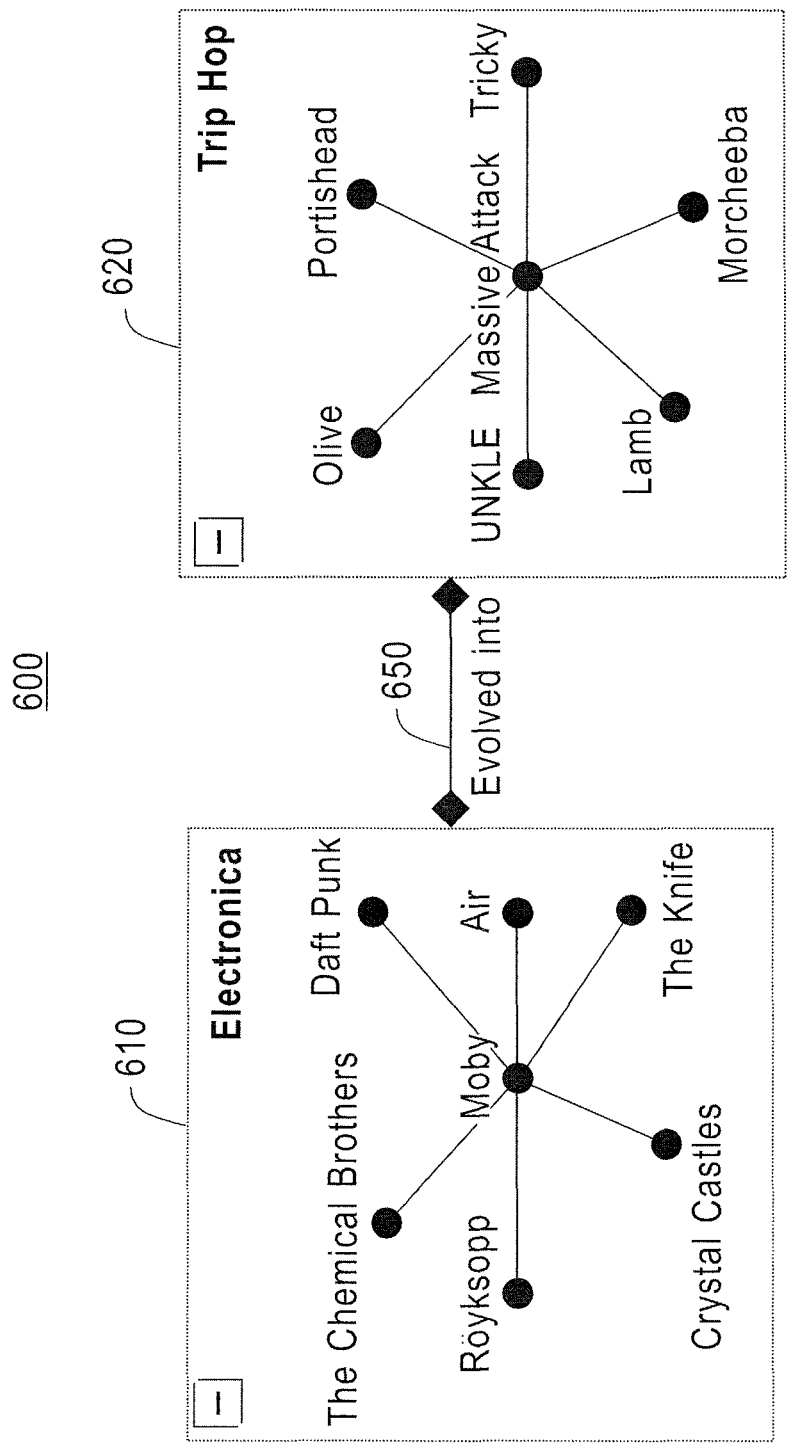
FIG. 6 shows another example of graph linking 600 to which the present principles may be applied, according to an embodiment of the present principles.
Figure 7:
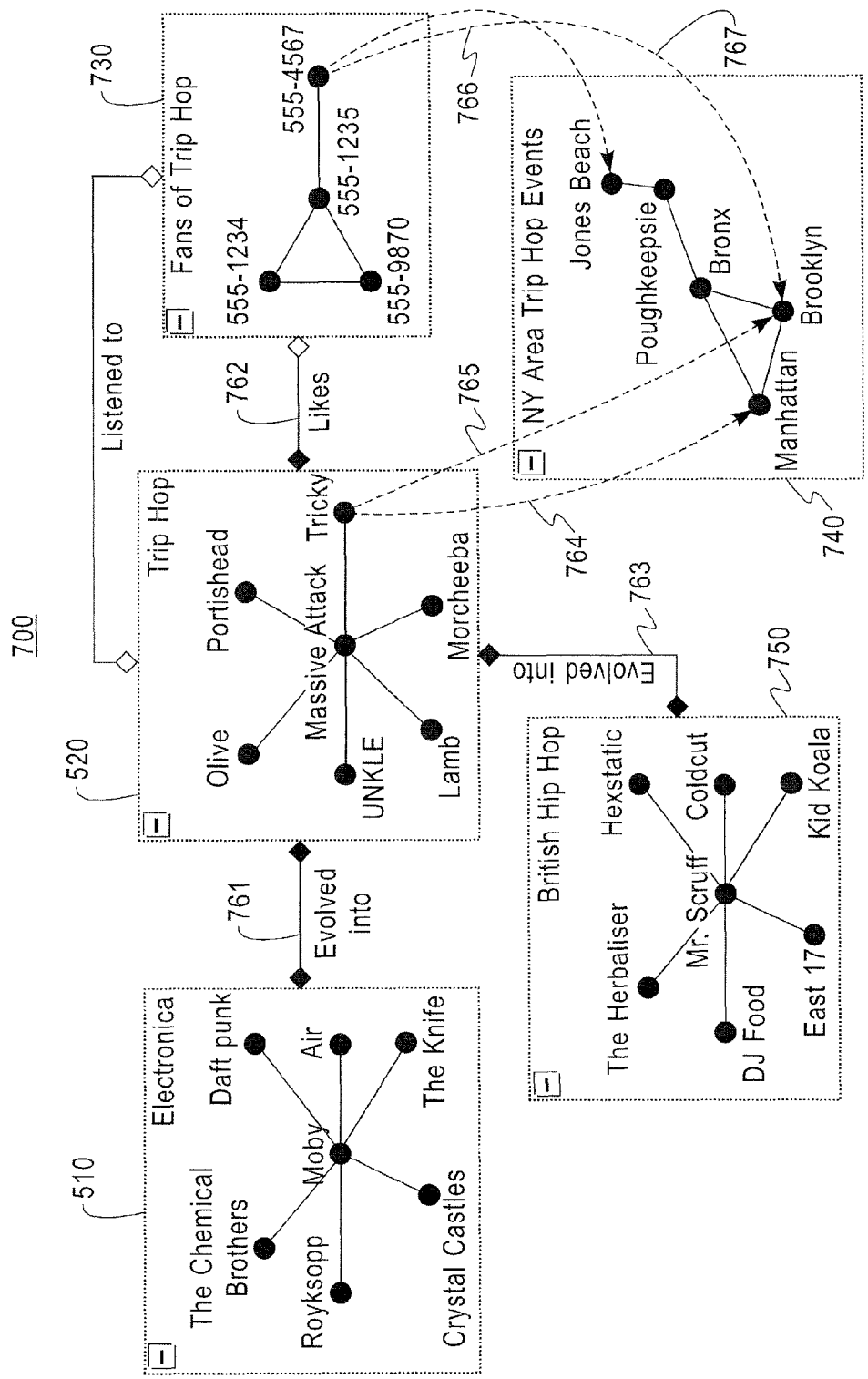
FIG. 7 shows additional examples of graph linking 700 to which the present principles may be applied, according to an embodiment of the present principles.

FIG. 4 shows a method 400 for supporting recursive dynamic provenance annotations over data graphs, according to an embodiment of the present principles. In FIGS. 5-7, we provide exemplary graphs to which the present principles may be applied, the latter, for example, as represented by the steps of method 400.

At step 410, a set $V_G$ of data graphs (not just simple nodes) is received as input. These can be graphs such as web page linking graphs, social networking graphs, information processing graphs, and so forth. FIG. 5 shows an example of graph linking 500 to which the present principles may be applied, according to an embodiment of the present principles. FIG. 6 shows another example of graph linking 600 to which the present principles may be applied, according to an embodiment of the present principles. In further detail, FIG. 6 shows an example of a first music graph 510 corresponding to music groups under the genre Electronica linked to a second music graph 520 corresponding to music groups under the genre Trip Hop, according to an embodiment of the present principles.

At step 420, a set $E_G$ of links between these graphs (the whole graphs and not links between individual nodes) is received as input. An example of such links is shown in FIG. 5, where we link 550 the data graph 510 of INTERNATIONAL BUSINESS MACHINES (IBM) web pages to a trivial graph 520 corresponding to the entity "IBM Intranet". The semantics of the links are application dependant. Another example of such links is shown in FIG. 6. In our music example relating to FIG. 6, the link 650 depicted therein evolved to represents the fact that the Electronica genre evolved/influenced the Trip Hop genre. Again this is a statement for the whole genre (graphs) and not for any individual music group in the genre.

FIG. 7 shows additional examples of graph linking 700 to which the present principles may be applied, according to an embodiment of the present principles. In further detail, FIG. 7 shows a first graph 510 corresponding to music groups under the genre Electronica, a second graph 520 corresponding to music groups under the genre Trip Hop, a third graph 730 corresponding to telephone numbers of fans of Trip Hop, a fourth graph 740 corresponding to New York (NY) area Trip Hop events, and a fifth graph 750 corresponding to music groups under the genre British Hip Hop. We note that the first graph 510 and the second graph 520 shown in FIG. 7 are also shown in FIG. 6, with the example of FIG. 7 adding further graphs and links. Link 761 connects the first graph 510 to the second graph. This link can be used to represent the fact that the Electronica genre has evolved into the Trip Hop genre (where the former genre is defined as all the groups that are distance one from Moby, and the latter as the set of all groups at distance one from Massive Attack). The link makes a statement about the genres as a whole, and not for any particular music group in the respective genres. Link 762 connects the second graph 520 to the third graph 730. This link can be used to represent the fact that the group of people called "Fans of Trip Hop" like to hear music of the Trip Hop genre. Again, this is a statement about a group of people as a whole and a genre, and not a statement about concrete persons and concrete groups. Such generic statements although very useful in practice (and very often used) cannot be represented by the current state of the art and are clearly one of the unique contributions of this work. Link 763 connects the fifth graph 750 to the second graph 520 to represent, in turn, the fact that the British Hip Hop genre has evolved from the Trip Hop genre. Link 764 connects the Trip Hop band Tricky in the second graph 520 to Manhattan in the fourth graph 740. This link states that Tricky performed in an event that took place in Manhattan and clearly illustrates that our model allows for a mix of traditional links (between simple objects) and novel links between whole graphs. In a similar manner, Link 765 connects the Trip Hop band Tricky to Brooklyn in the fourth graph 740 to express the fact that Tricky also performed in Brooklyn. Link 766 connects the Trip Hop fan having the telephone number 555-4567 in the third graph 730 to Jones Beach in the fourth graph 740 to denote the fact that the particular fan has attending the indicated event in Jones Beach. Similarly, Link 767 connects the Trip Hop fan having the telephone number 555-4567 in the third graph 730 to Brooklyn in the fourth graph 740.

At step 430, a set $V_Q$ of query graph patterns (and/or graphs corresponding to query graph patterns) is received as input. One can think of these query patterns as multiple independent queries. In a SPARQL-like syntax, such query graph patterns can look as follows:

```
<rdfq: statement#lastfml> ?s1 <lastfm:similarTo>
   <lastfm: artist#MassiveAttack> .
```

-continued

```
<rdfq:statement#cdr1> ?s2
<cdr:wasPresentAt        aCity .
<rdfq: statement#cdr2>
<geo:state#NY> <geo:hasPart>
   aCity.
```

The first query graph pattern identifies all artists that are similar to the Massive Attack group. The second query graph identifies people who attended a concert in NY state.

At step 440, a set $E_Q$ of query links between the query graph patterns in the set $V_Q$ is received as input. The query links in the set $E_Q$ connect graph pattern queries in order to create higher level query patterns. Thus, a link, e.g., denoted hereinafter as "likes", might connect the two graph pattern graphs looking for a social network of people that like groups which are closely related to massive attack but also have attended NY state concerts.

At step 450, we evaluate the query $Q(V_Q, E_Q)$ over the data graph represented by $G(V_G, E_G)$. That is, we evaluate the query $Q(V_Q, E_Q)$ that includes the query graph patterns of set $V_Q$ (per step 430) linked with the query links of set $E_Q$ (per step 440), over the data graphs of set $V_G$ (per step 410) which are linked with the data links of set $E_G$ (per step 420). In one embodiment of this evaluation procedure, we identify subsets of nodes of $V_G$ that are either identical to, or super-sets of, the sets of nodes described in $V_Q$ (e.g., but not limited to, using techniques on query containment of graph algebras). Next, we identify links in $E_Q$ (and their inheritance properties) connecting nodes from $V_Q$ and compare those with the links in $E_G$ that connect the identified nodes of $V_G$. The inheritance properties of links in $E_Q$ and $E_G$ are particularly important in identifying whether we are going to only consider sub-graphs of the data graph $G(V_G, E_G)$ that exactly match graphs in the query graph (for the non-inheritance properties) or also consider super-graphs (for the inheritance properties). Putting it all together, as a last step of this embodiment we create graphs that satisfy $Q(V_Q, E_Q)$ by being homomorphic to the input query $Q(V_Q, E_Q)$ but whose components come from the identified sub-graphs of the data graph. Of course, alternatively the user can define evaluation procedures where the graphs are isomorphic only to $Q(V_Q, E_Q)$ or satisfy some other desirable property.

In another embodiment of this evaluation procedure, the order with which the nodes and links are considered is reversed. That is, we first use the links in $E_Q$ to find corresponding matching links in $E_G$. Then, we compare the sets of nodes connected to the links in $E_G$ and identify only those nodes that correspond to nodes appearing in $E_Q$. Then, again as a last step we create sub-graphs of the data graph $G(V_G, E_G)$ that satisfy $Q(V_Q, E_Q)$ by being homomorphic (or have some other desirable property) to the input query $Q(V_Q, E_Q)$.

In yet another embodiment of the procedure, instead of operating directly on $V_G$ and $E_G$ for the identification of qualifying nodes and links, a data index over $G(V_G, E_G)$, or a data summary of $G(V_G, E_G)$, may be used for the quick identification of nodes/links of the data graph that are relevant to the query graph $Q(V_Q, E_Q)$ and for the construction of the sub-graphs of the data graph $G(V_G, E_G)$ that satisfy the constraints imposed by the query graph $Q(V_Q, E_Q)$.

At step 460, the answer $A(V_A, E_A)$ of evaluating Q(G) is provided to the user.

In consideration of method 400, we note the following deficiencies of the prior art with respect to method 400, all of which are clearly overcome by the approach employed by method 400. For example, prior art graph representation models only support simple, static links. Moreover, graphs in the prior art are defined extensionally or as mere macros. Additionally, queries in the prior art are limited within a single graph and do not span (or use) the links between graphs.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    receiving a plurality of dynamic graphs representing dynamic provenance data;
    evaluating a provenance query over the plurality of dynamic graphs to obtain an answer to the provenance query; and
    providing to a user the answer to the provenance query, using at least a display device.

2. The method of claim 1, wherein the plurality of dynamic graphs are intensionally defined.

3. The method of claim 1, wherein each of the plurality of dynamic graphs comprises a plurality of nodes, and at least one of the plurality of nodes of at least one of the plurality of dynamic graphs comprises a respective one of the plurality of dynamic graphs.

4. The method of claim 3, wherein at least another one of the plurality of nodes comprises a respective static graph representing static provenance data.

5. The method of claim 1, wherein each of the plurality of dynamic graphs is recursively and dynamically connected using one or more recursive dynamic links.

6. The method of claim 5, wherein an evaluation of the provenance query considers the dynamic graphs and the one or more recursive dynamic links.

7. The method of claim 1, wherein the dynamic provenance data comprises dynamic annotations representing provenance metadata.

8. A system, comprising:
    a user interface having an input device configured to receive a plurality of dynamic graphs representing dynamic provenance data; and
    a query evaluator configured to evaluate a provenance query over the plurality of dynamic graphs to obtain an answer to the provenance query,
    wherein the user interface further comprises a display device configured to provide the answer to the provenance query to a user.

9. The system of claim 8, wherein the plurality of dynamic graphs are intensionally defined.

10. The system of claim 8, wherein each of the plurality of dynamic graphs comprises a plurality of nodes, and at least one of the plurality of nodes of at least one of the plurality of dynamic graphs comprises a respective one of the plurality of dynamic graphs.

11. The system of claim 10, wherein at least another one of the plurality of nodes comprises a respective static graph representing static provenance data.

12. The system of claim 8, wherein each of the plurality of dynamic graphs is recursively and dynamically connected using one or more recursive dynamic links.

13. The system of claim 12, wherein an evaluation of the provenance query considers the dynamic graphs and the one or more recursive dynamic links.

14. The system of claim 8, wherein the dynamic provenance data comprises dynamic annotations representing provenance metadata.

15. The system of claim 8, wherein the user interface further comprises a visual query editor configured to receive user inputs directed to visual editing of the provenance query.

16. A non-transitory computer readable storage medium comprising a computer readable program, wherein the computer readable program when executed on a computer causes the computer to perform the following:
  receive a plurality of dynamic graphs representing dynamic provenance data;
  evaluate a provenance query over the plurality of dynamic graphs to obtain an answer to the provenance query; and
  provide the answer to the provenance query to a user.

17. The non-transitory computer readable storage medium of claim 16, wherein the plurality of dynamic graphs are intensionally defined.

18. The non-transitory computer readable storage medium of claim 16, wherein each of the plurality of dynamic graphs is recursively and dynamically connected using one or more recursive dynamic links, and an evaluation of the provenance query considers the dynamic graphs and the one or more recursive dynamic links.

19. A method, comprising:
  receiving a set $V_G$ of data graphs representing dynamic provenance data;
  receiving a set $E_G$ of data links between the data graphs in the set $V_G$;
  receiving a set $V_Q$ of query graph patterns;
  receiving a set $E_Q$ of query links between the query graph patterns in $V_Q$;
  evaluating an input query represented by the query graph patterns linked with the query links, over the data graphs linked with the data links, to obtain an answer; and
  providing the answer to a user, using at least a display device.

20. The method of claim 19, wherein the data graphs in the set $V_G$ comprise one or more of web page linking graphs, social networking graphs, and information processing graphs.

21. The method of claim 19, wherein the data graphs in the set $V_G$ are intensionally defined.

22. The method of claim 19, wherein the data graphs in the set $V_G$ are expressed in resource description framework.

23. The method of claim 19, wherein the query graph patterns in the set $V_Q$ are expressed in at least one of resource description framework data query language and resource description framework query language.

24. The method of claim 19, wherein the data links in the set $E_G$ are associated with inheritance related properties pertaining to whether a given one of the data links between two of the data graphs is inherited by subgraphs thereof.

25. A non-transitory computer readable storage medium comprising a computer readable program, wherein the computer readable program when executed on a computer causes the computer to perform the method steps as recited in claim 19.

* * * * *